June 9, 1931. C. HAFFKE 1,809,119
LUGGAGE CARRIER
Filed July 24, 1929 3 Sheets-Sheet 1

Inventor
Charles Haffke
By Hiram A. Sturges
Attorney

June 9, 1931.  C. HAFFKE  1,809,119
LUGGAGE CARRIER
Filed July 24, 1929   3 Sheets-Sheet 2
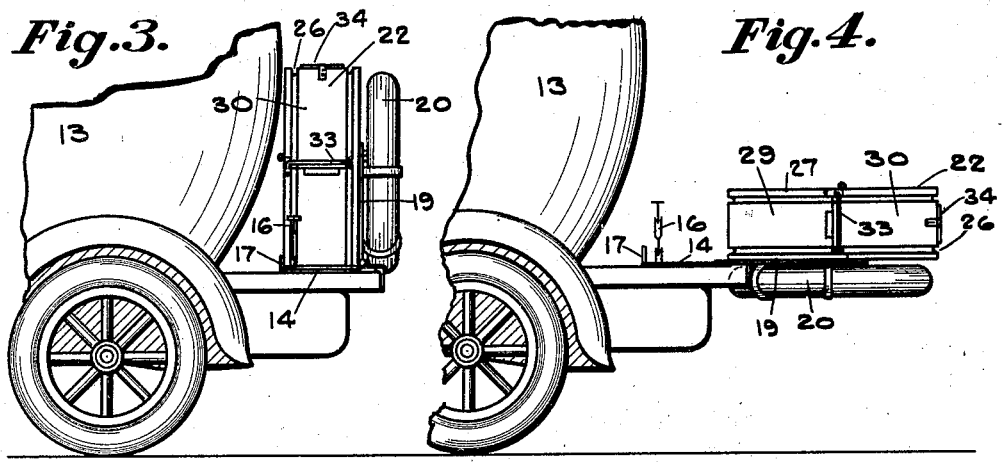
Fig. 3.
Fig. 4.
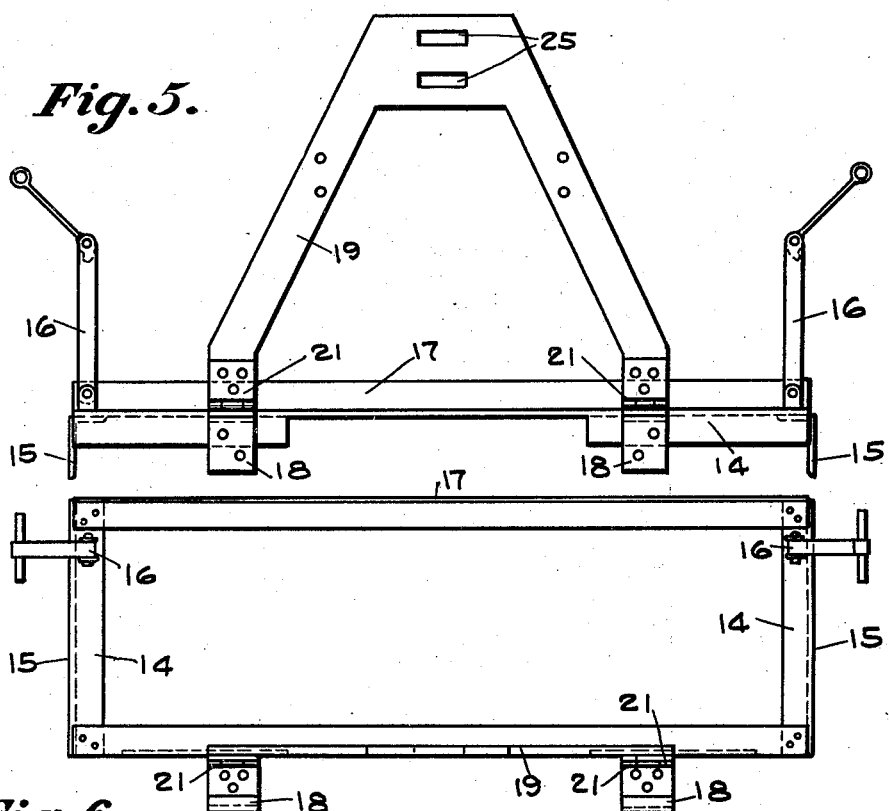
Fig. 5.
Fig. 6.
Inventor
Charles Haffke
By *Hiram A. Sturges*
Attorney June 9, 1931.  C. HAFFKE  1,809,119
LUGGAGE CARRIER
Filed July 24, 1929   3 Sheets-Sheet 3
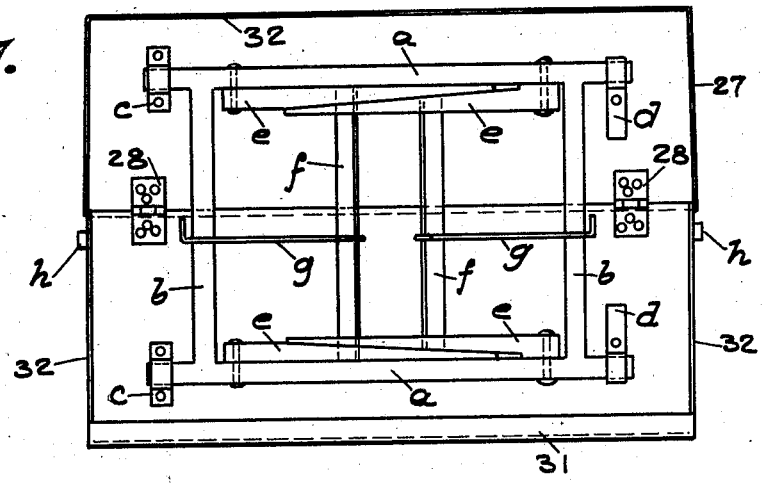
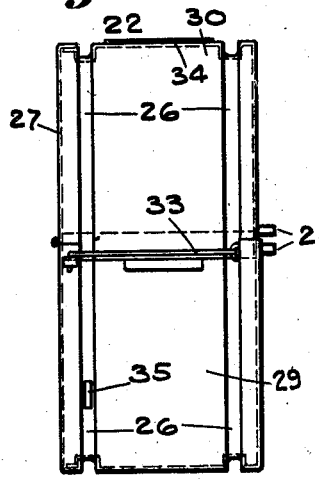
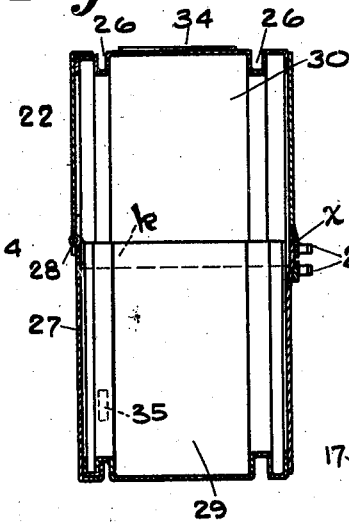
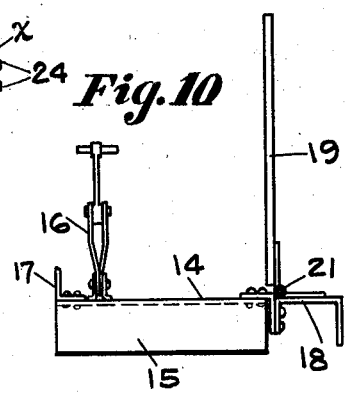
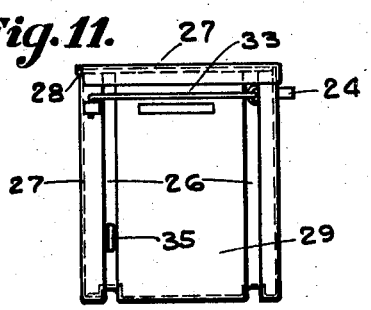
Inventor
*Charles Haffke*
By Hiram A. Sturges
Attorney Patented June 9, 1931

1,809,119

UNITED STATES PATENT OFFICE

CHARLES HAFFKE, OF BOISE, IDAHO

LUGGAGE CARRIER

Application filed July 24, 1929. Serial No. 380,717.

This invention relates to a luggage carrier for vehicles and particularly adapted for the use of tourists.

One of the objects of the invention is to provide a luggage carrier to contain camp equipment for use of automobile tourists, said carrier to be of such construction that it may contain equipment sufficient for the use of a large party or may be readily reduced in size for the use of two or three persons.

Another object is to provide a luggage carrier which may be conveniently mounted on an automobile or other similar vehicle and may be readily removed therefrom.

The invention includes a luggage carrier which may be converted into a dining table together with seats at the table.

It is an object of the invention to provide an article for the purposes mentioned which will consist of few and simple parts so that it may be manufactured at a limited cost, strong and will be durable and convenient in use and will provide a mounting for a spare tire.

With the foregoing objects in view and others to be mentioned the invention presents a new and useful construction, combination and arrangement of parts as described herein and claimed, and as shown in the accompanying drawings, it being understood that changes may be made in form, size, proportion of parts and minor details, said changes being determined by the scope of the invention as claimed.

Figure 1:
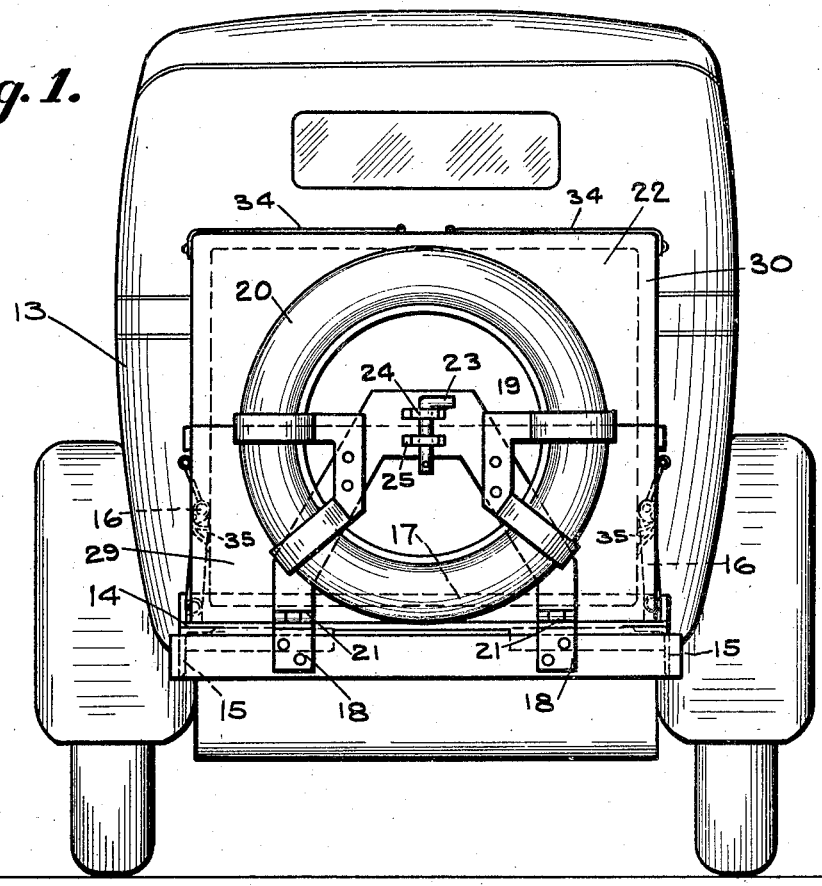
Figure 2:
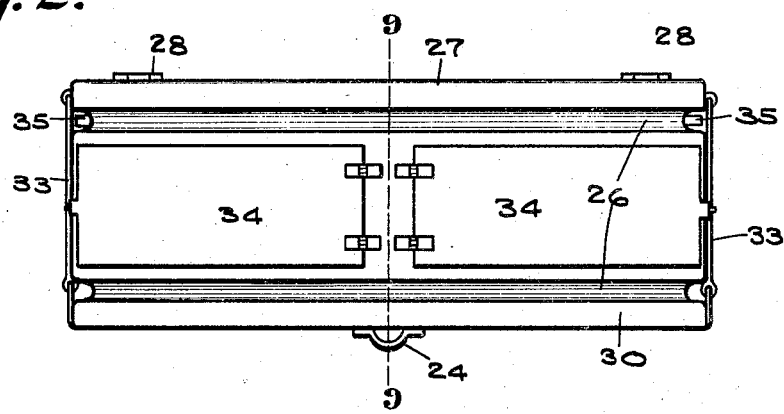

In the drawings Fig. 1 shows a side view of the luggage carrier, the latter being mounted on an automobile. Fig. 2 is a plan view of the box or container. Fig. 3 shows an end view of the luggage carrier mounted on an automobile. Fig. 4 is a view similar to that shown in Fig. 3, parts being swung down to a horizontal position convenient for loading or unloading the container. Fig. 5 is a side view of a base support, the wing or tire-holder being disposed in a vertical position. Fig. 6 is a plan view of the parts shown in Fig. 5. Fig. 7 is a view of the inner side of a removable side of the box or container provided with legs for a table. Fig. 8 is an end view of the container. Fig. 9 is a sectional view on line 9—9 of Fig. 2. Fig. 10 is an end view of the base-support shown in Figs. 5 and 6, the table-legs being removed. Fig. 11 is an end view of the luggage carrier when reduced in size.

Referring now to the drawings for a more particular description, the invention is shown and described in connection with an automobile 13 upon which the luggage carrier may be mounted. While the device is intended for the use of automobile tourists, the kind of vehicle is not important, and the device could of course be used as a storage or stationary article.

Numeral 14 indicates a horizontal base support which may be secured to the vehicle by any suitable means, flanges 15 being shown for this purpose.

The base is provided at its ends with a pair of pivotally mounted latches 16, and rearwardly of said latches is provided with an upwardly projecting stop-plate 17.

Numeral 18 indicates a pair of brackets which project rearwardly from the base 14 and are secured thereto and to the vehicle.

Numeral 19 indicates a tire-holder for a spare tire 20, said holder preferably being of inverted V-shape, its arms being connected with the base-support 14 by means of hinges 21.

The base support may have any suitable construction to provide the parts mentioned, but preferably attenuated angle iron or strap irons are used. This base-support is simply to provide a holder for the receptacle 22 which may contain camp equipment and to provide a holder for a spare tire.

The base-support is preferably of rectangular form in plan as best shown in Fig. 6 of the drawings, and the box, container or receptacle 22 is preferably of rectangular form in plan and side elevation, and its construction, including means for removably securing it in an upright position upon the base-support, will presently be described in detail.

As thus described it will be seen that the tire-holder 19 may be swung downwardly to the position shown in Fig. 4 of the drawings to permit the receptacle 22 to be mounted upon or removed from the tire-holder 19 and base 14 or to be removed therefrom, the tire-holder at that time engaging and being supported by the brackets 18.

After the base-support has been swung upwardly to the position shown in Fig. 3 of the drawings the tire-holder 19 may be secured to or detached from the receptacle 22, a pin 23 being used for engaging in staples 24 which are provided for said receptacle, the tire-holder 19 being provided with slots 25 for receiving the staples. Other means may of course be used for securing the tire-holder to the receptacle.

The receptacle 22 is preferably constructed of sheet metal and is reinforced by the formation of grooves 26, said grooves being formed in the top, bottom and ends adjacent to the opposed sides of the receptacle, and having a considerable depth so that they will operate to reinforce the walls of the receptacle for sustaining stresses directed thereto incident to its use.

The receptacle or container 22 preferably consists of three parts, one of these parts being a side-plate 27 divided midway between its side edges as best shown in Fig. 7 of the drawings to provide two parts connected by a pair of hinges 28.

This side-plate 27, for one of its uses, provides a mounting upon its inner face for a table frame consisting of side strips $a$ and end-strips $b$, the side strips being disposed with one of their ends engaging in staples $c$ which are secured to said plate 27, the opposite ends of the side strips being removably secured to said plate by means of swing-catches $d$ which are pivotally mounted on said plate, pairs of table-legs $e$ being employed and pivotally mounted to swing from the side-strips $a$, the legs of each pair being connected by brace-strips $f$. A pair of hooks are indicated at $g$, each hook being connected at one of its ends to a brace-strip $f$, its opposite end being adapted to be caught upon a staple $h$, said staples being mounted upon the ends of said plate 27.

It will be understood that when the parts are disposed as shown in Fig. 7 of the drawings the side-plate 27 for the receptacle will remain in, approximately, a rigid condition, the hinges 28 not being operative to permit any swinging movement of the two wings of said side-plate.

Also it will be understood that each pair of legs $e$ may be swung to positions at right angles to the plate 27, the hooks $g$ being disposed in engagement with the staples $h$. The plate 27 may then be inverted so that the parts will operate as a table.

When not used as a table the legs are swung inwardly to lie upon the inner surface of said side-plate 27, and therefore the legs and the strips $a$ and $b$ will occupy a very limited space.

The remaining two parts for the receptacle or container 22, are two half portions, these being a lower half portion 29 and an upper half-portion 30.

As best shown in Fig. 9 of the drawings, one of the means for securing the two halves 29 and 30 in connected relation is by sliding the end-portions $k$ of the lower half 29 inwardly of the end-portions $x$ of the upper half portion 30 of the receptacle 22. It will be understood that the portions $k$ and $x$ referred to are disposed at the respective ends of half-portions 29 and 30 of the receptacle 22 outwardly of the grooves 26, and since these parts are somewhat longer for the lower half portion 29 than the corresponding parts for the upper half portion 30, said end portions $k$ may slide inwardly of and may engage the parts $x$, and on account of friction, will tend to hold the half-portions 29 and 30 in connected relation.

The side-plate 27 is provided with a curved flange 31 of such proportions that it will enter one of the grooves 26 when said plate is applied to the receptacle, said flange 31 operating as a holder or fastening element and said plate is provided at its three remaining edges with flanges 32, and after the side-plate 27 has been applied to the receptacle it may be readily secured thereto by means of a pair of hook-bars 33, which are secured to and extend across the ends of the receptacle and which are adapted to engage in staples $h$ above mentioned, and when the side-plate 27 has been secured as herein described the three parts mentioned for said receptacle 22 will remain in closed or locked relation.

Numerals 34 indicate doors which are provided for the upper half 30 of the receptacle.

It will be noted that the use of the bolt or pin 23 when engaging in the staples 24 as shown in Fig. 1 of the drawings operates to connect the lower and upper half-portions of the receptacle 22.

Numerals 35 indicate a pair of lugs or catches which are provided for the lower half 29 of the receptacle 22. These lugs are disposed in the channels or grooves 26 at the ends of said lower half-portion and are adapted to be engaged by the pair of latches 16 of the base-support 14 for securing the receptacle 22 in an upright position upon said base-support.

In operation, the receptacle 22 may be placed upon the base-support in engagement with the upright stop-plate 17. The latches 16 may then be swung upwardly for engaging the lugs 35. The tire-holder 19 may then be swung upwardly to permit its end to be secured to the staples 24, and for removal of the receptacle 22, this operation may be reversed.

When placing articles in the receptacle 22 or removing articles therefrom, said receptacle may be disposed horizontally upon the tire-holder as shown in Fig. 4 of the drawings, this being a matter of convenience, and at this time the side-plate 27 may be readily removed or replaced.

It will be understood that when the table is used, the half portions 29 and 30 may be separated from each other and may then be used as seats.

By referring to Fig. 11 of the drawings it will be seen that the side-plate 27 may be removably secured to the half-portion 29 of the receptacle 22 to form a container of reduced volume. For this purpose the table legs and their frame are removed from the side-plate 27. The latter is then disposed with its two wings at right-angles to each other for covering the bottom and one of the sides of said half-portion 29 and thereby forming a receptacle having a volume approximately equal to one-half the volume of the receptacle 22.

This last named feature is of importance since it is often convenient to use a luggage carrier of reduced size.

The luggage carrier shown in Fig. 11 is the same in all respects as heretofore described, and may be secured to the base-support in the same manner as heretofore explained, its size being reduced.

I claim as my invention,—

In a luggage carrier for a vehicle, a base support carried by the vehicle and provided with an upright stop plate, and a plurality of brackets, a rectangular receptacle adapted to be disposed on the base support in engagement with said stop plate, said receptacle being provided with grooves opening on its top and ends and having lugs disposed in said grooves, a tire holder hingedly mounted on the base support and removably secured to the receptacle, and latches pivotally mounted on the base support at each end thereof outwardly of said stop plate and arranged to removably engage the lugs of said receptacle, said tire holder being adapted to be swung upwardly for disposing the receptacle in a vertical position and to swing downwardly into contact with said brackets for disposing the receptacle in a horizontal position.

In testimony whereof, I have affixed my signature.

CHARLES HAFFKE.